(12) United States Patent
Wong

(10) Patent No.: US 6,544,320 B2
(45) Date of Patent: Apr. 8, 2003

(54) AIR-CLEANING APPARATUS

(75) Inventor: Ying Man Wong, Shatin (HK)

(73) Assignee: Broad Ocean Company Limited, Shatin (HK)

(*) Notice: Subject to any disclaimer, the term of this patent is extended or adjusted under 35 U.S.C. 154(b) by 0 days.

(21) Appl. No.: 09/780,209

(22) Filed: Feb. 9, 2001

(65) Prior Publication Data

US 2002/0108497 A1 Aug. 15, 2002

(51) Int. Cl.[7] ................................................ B01D 47/06
(52) U.S. Cl. ............................ 96/240; 96/273; 96/277; 96/325; 96/327
(58) Field of Search .............................. 95/216; 96/240, 96/272, 273, 274, 277, 325, 327, 328

(56) References Cited

U.S. PATENT DOCUMENTS

| | | | |
|---|---|---|---|
| 2,802,543 A | * | 8/1957 | Clark |
| 3,246,452 A | * | 4/1966 | Arvanitakis |
| 3,266,224 A | * | 8/1966 | Ferretti |
| 3,993,448 A | * | 11/1976 | Lowery, Sr. |
| 4,588,535 A | | 5/1986 | Foidl |
| 4,609,386 A | * | 9/1986 | Sibley et al. |
| 4,734,108 A | | 3/1988 | Cox et al. |
| 5,135,550 A | | 8/1992 | Telchuk et al. |
| 5,192,345 A | | 3/1993 | Pala |
| 5,938,820 A | | 8/1999 | Peters et al. |
| 6,267,804 B1 | * | 7/2001 | Marlowe |
| 2002/0108497 A1 | * | 8/2002 | Wong |

FOREIGN PATENT DOCUMENTS

| | | |
|---|---|---|
| DE | 197 53 227 A 1 | 6/1999 |
| JP | 09-253440 | 9/1997 |
| JP | 09-253442 | 9/1997 |
| JP | 11-057369 | 3/1999 |

* cited by examiner

Primary Examiner—Duane S. Smith
(74) Attorney, Agent, or Firm—Alix, Yale & Ristas, LLP

(57) ABSTRACT

An air cleaning apparatus draws air through a convoluted air channel defined by a plurality of non-permeable baffles. The baffles are arranged so that the air stream must change direction several times before exiting the apparatus. A fluid curtain is disposed along at least a part of the convoluted channel to remove particulate material from the air stream. One preferred embodiments causes fluid to flow over the baffles to provide a plurality of fluid curtains arranged along the air channel.

12 Claims, 3 Drawing Sheets

AIR-CLEANING APPARATUS

FIELD OF THE INVENTION

The present invention relates to an air cleaning or air treatment apparatus and, more particularly, to an air-cleaning or air-treatment apparatus which is particularly useful for domestic use.

BACKGROUND OF THE INVENTION

Air pollution is a major environmental problem around the world. Polluted air is a known cause of many chronic diseases which can be hazardous to the young, the old and people suffering from chronic diseases such as heart diseases, allergies or respiratory system disorders. Major pollutants or contaminants of urban and city air include dusts, ashes and particles and gases emitted by vehicles and industry. Pollens, ashes and dusts are the major pollutants of country air. In order to reduce airborne pollutant levels and to improve indoor air quality, air treatment apparatuses, which are equally known as air purifiers, air cleaners and air filters, are frequently deployed in homes, offices, schools, halls and other establishments to improve air quality.

Solid state mesh or grille type filters are commonly used in conventional air cleaners to remove granulate, particulate or other pollutants from air. These type of filters usually include an assembly of filtering screens on each of which there are closely disposed a large number of very fine and tiny apertures. High efficiency particulate air filters ("Hepa filters") are probably the most well-known type of conventional filters which have a minimum particle removal efficiency of 99.97 percent. Conventional filters usually operate by the physical blocking of airborne air particles.

Hence, it will follow in general that air filters having microscopic apertures are required to block off microscope or tiny particulate pollutants. However, conventional solid state filters having very fine or tiny filter apertures are prone to clogging which means frequent maintenance, servicing or cleaning of the filter elements is required in order to provide continuous optimal operations. Furthermore, conventional air filters remove particles and other pollutants by forcing an incoming air stream through the very fine apertures which are usually densely disposed on the filtering element. The total air-flow rate is therefore dependent on and proportional to the aggregate of the area of the fine apertures on the filtering elements. To increase the air-flow rate, filter elements have been made into various shapes and configurations, for example, shapes resembling the expandable bellow of a hand-held organ or by including a large number of fin shaped filtering elements, to increase the total filtering surface which is inserted between the air-inlets and air-outlets.

However, because of the inherent nature of conventional filters that the filtering surface must be inserted between the air-inlets and the air-outlets to block the incoming air stream so that the incoming air stream has to pass through the filtering elements before reaching the air-outlets to achieve optimal filtering, there is an inherent limit of the maximum blocking surface which can be provided for a given cross-sectional area between the air-inlets and the air-outlets. Additionally, the need to draw air through such filters increases the size and cost of the motor due to the load placed on the system by the filter itself. In addition, filtering elements having a lot of closely packed surfaces, as in the case of the bellow- or fin-type elements, are more prone to clogging and are more difficult to clean since the clogging particles are difficult to remove. Such filtering elements would therefore have shorter mean-time between service or replacement and are therefore not convenient or economical. It is therefore desirable if air cleaners having filter elements of a design which will substantially alleviate the known short-comings associated with conventional filter elements can be provided.

OBJECTION OF THE INVENTION

It is therefore an object of the present invention to provide air cleaners which are equipped with filtering means which substantially alleviate the short-comings associated with the afore-said filtering elements used in conventional air filters. It is also an object of the present invention to provide an air filtering system for use in air-cleaners in which the surface area which needs to be clean for the removal of particles clogging the filtering apertures is significantly less than the effective pollutant blocking surface area of the filtering system. Furthermore, it is also an object of the present invention to provide a useful alternative or choice of an air cleaner or an air filtering system for an air-cleaner to the general public.

SUMMARY OF THE INVENTION

According to the present invention, there is provided an air cleaning apparatus including an air-inlet, an air-outlet, an air-cleaning means, a compartment inside which there is disposed an air channel joining said air-inlet and said air-outlet, and an air-drawing device drawing air into said compartment, wherein said air channel is adapted to cause an air stream coming into said compartment through said air-inlet to flow substantially only along said air-channel towards said air outlet and said air-cleaning means includes a fluid curtain disposed at least along a part of said air-channel.

BRIEF DESCRIPTION OF THE DRAWINGS

A preferred embodiment of the present invention is now explained by way of example and with reference to the accompanying drawings, in which.

DETAILED DESCRIPTION OF THE PREFERRED EMBODIMENTS

Figure 1:
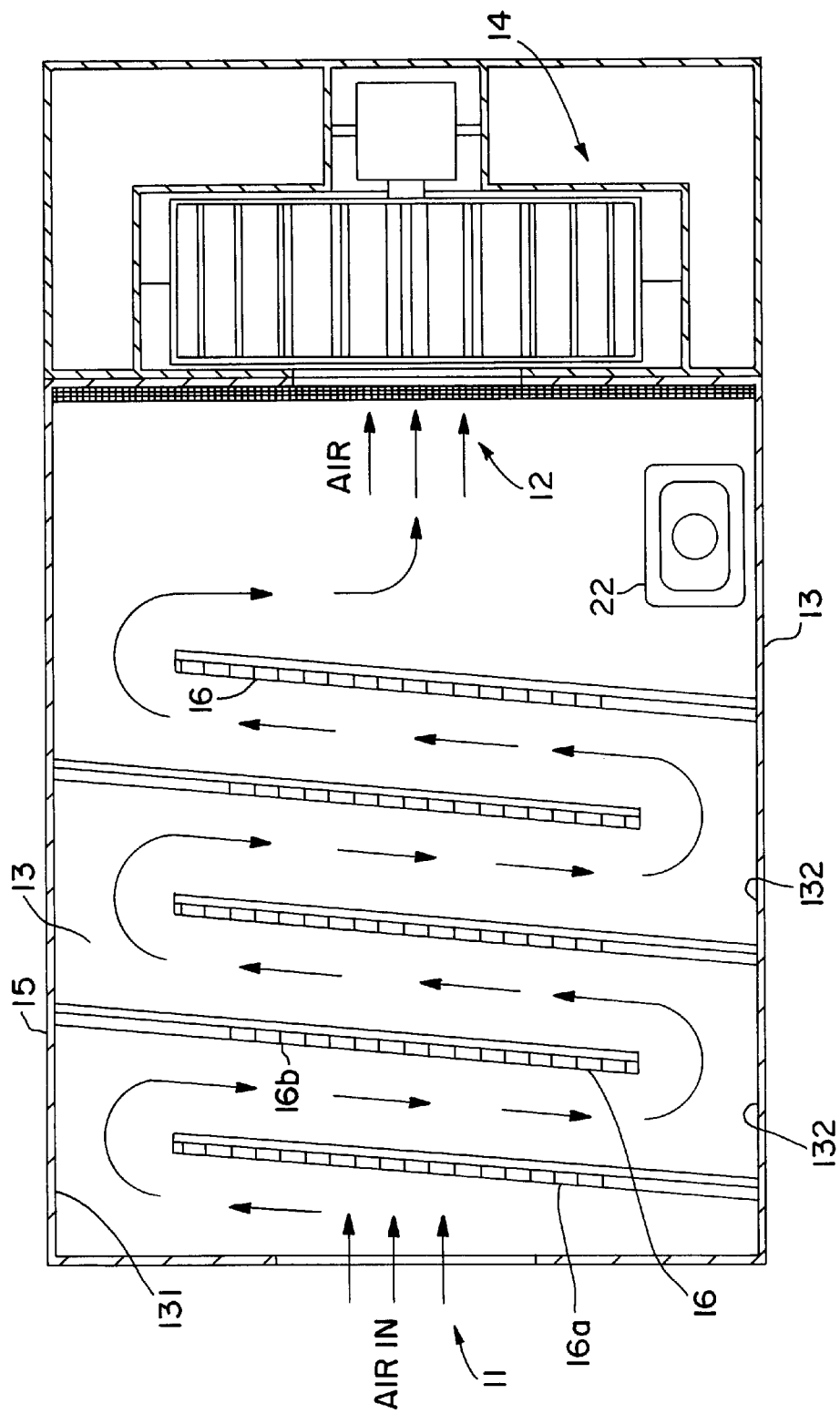
FIG. 1 is a horizontal sectional view of the preferred embodiment of the air cleaner taken from the top when the air cleaner is in operation.
Figure 2:
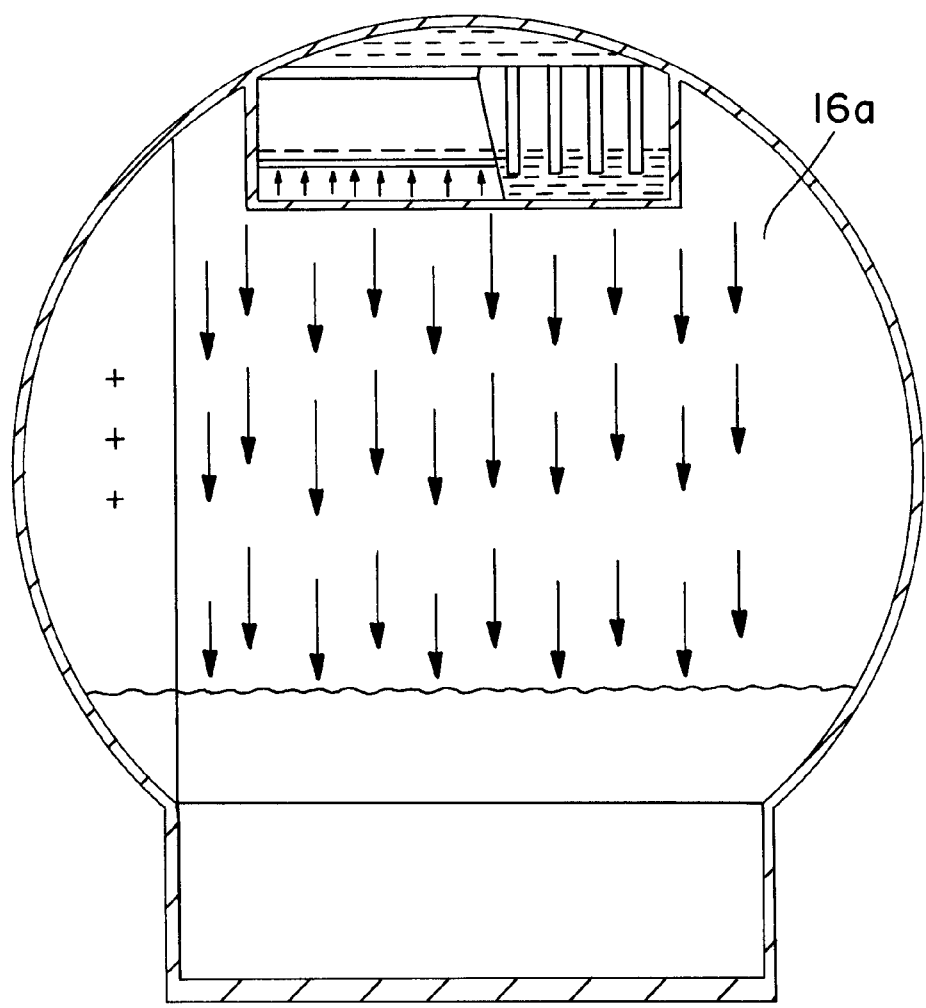
FIG. 2 is a vertical sectional view of the air cleaner of FIG. 1 taken from the line A—A.
Figure 3:
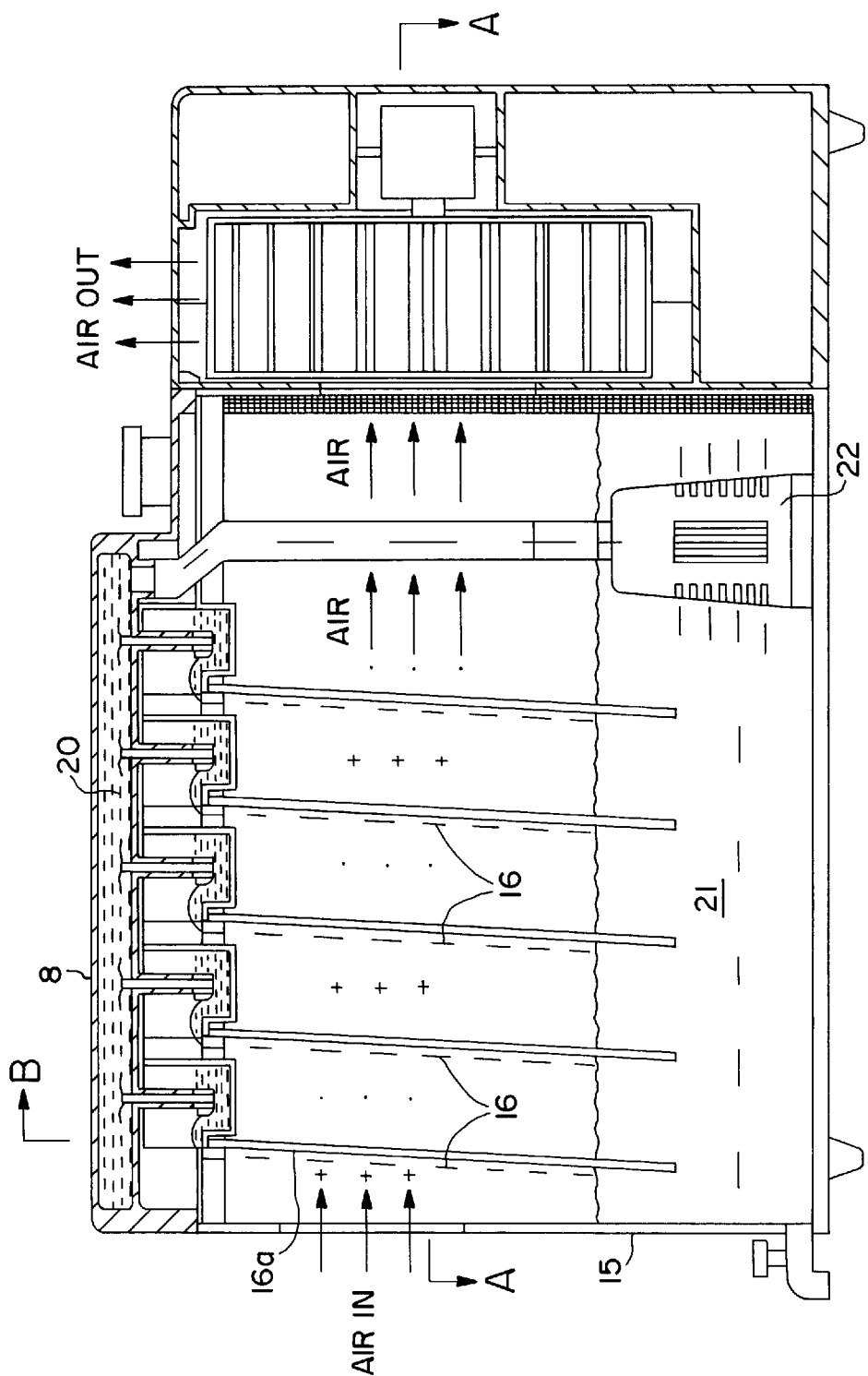
FIG. 3 is a partial sectional view of the air cleaner of FIG. 1 taken along the line B—B.

Referring to the Figures, there is shown a preferred embodiment of an air-cleaner (1) of the present invention. The air cleaning apparatus (1), which may also be referred to as an air purifier, air filter or an air treatment apparatus, includes an air-inlet (11), an air-outlet (12), an air-cleaning means, a compartment (13) joining the air-inlet (11) and the air-outlet (12) and an air-drawing device (14). The air-drawing device (14) is provided to draw the air to be cleaned into the compartment. The air-drawing device (14) can, for example, be a centrifugal fan mounting adjacent to the air-outlet so that a partial vacuum or low pressure area is created at the air-outlet end of the compartment so that air from outside the compartment will be drawn into the compartment. The compartment (13) may include an enclosure which joints the air-inlet and the air-outlet. The enclosure

(15) is preferably substantially air-tight so that the air inside the enclosure is substantially separated from the air outside the enclosure and there will be only minimal exchange of air inside and outside of the compartment except through the air-inlet and the air-outlet.

An air cleaning system is disposed within the enclosed space of the compartment. The air cleaning system includes a plurality of air-cleaning baffles (16) which together define the flow path of the air through the compartment and which sequentially clean an incoming air stream when the air stream travels from the air-inlet (11) to the air-outlet (12) through the path defined by the disposition of the air cleaning baffles. Each of the air-cleaning baffles includes a non-permeable screen extending from one side of the compartment until it is near the other side of the compartment, leaving a gateway for the moving air to travel towards the next air-cleaning baffle. The next air-cleaning baffle preferably extends from the side of the compartment which is separated from the last air-cleaning baffle so that the air coming in from the last air-cleaning baffle will be blocked by the down-stream baffle and is caused to change its course to flow along the air-cleaning surface of the next air-cleaning baffle. This provides an elongated pathway for the air across the face of the baffles.

Referring to the Figures, it can be seen that the first baffle (16a) is placed adjacent to the air-inlet and is disposed at an orientation which is substantially normal to the course of the incoming air stream to provide a significant collision between the incoming air stream and the air-cleaning surface of the baffle. Upon the initial impact on the first baffle, the incoming air stream is caused to change its course so that it will continue to flow along the surface of the first air-cleaning baffle towards the low-pressure region of the compartment. When the air stream encounters the side (131) of the compartment and the next air-cleaning baffle (16b), the air stream will be caused to change course again. By interposing the air baffles in a substantially parallel manner and by attaching the edges of the baffles alternately to the opposite (131 and 132) sides of the compartment; the air stream will be caused to substantially reverse its course upon every impact with the sides of the compartment, thereby substantially increasing the actual physical length of path which the air has to travel between the air-inlet and the air-outlet and increasing the total cleaning surface area. Furthermore, by a substantial reverse of the course of the air flow, different sides of the air mass will be in contact with the air-cleaning surfaces of the baffles and cleaned, thereby providing a more thorough cleaning of the incoming stream.

While the present embodiment has been explained with reference to the specific examples of the air-cleaning baffles, it will be appreciated that the actual physical length to achieve the necessary cleaning can be significantly increased also by forming a confined air-channel which is C-, U- or V-shape within the compartment.

Alternatively, the air-cleaning baffles may be arranged to form a zig-zag or W-shaped air-channel within the compartment to increase the actual physical distance to be covered by an air stream during transit through the compartment. The baffles may be corrugated or similar also.

The air-cleaning baffle in the present embodiment is provided with a running curtain of water to collect the pollutants since it is well-known that airborne particles have an affinity for water and, at the same time, water-soluble gaseous pollutants can to some extent be dissolved and removed upon impact or collison with a water curtain. The cleaning water is provided by a water source (20) which is placed near or at the top of the compartment. The water source distributes a supply of water along the width of the baffle and to cause water to flow down from the top of the baffles towards the bottom by gravity. As a result, a water curtain which becomes the air-cleaning baffle of the present air-cleaning system is formed. The used water is then collected at the bottom of the compartment which forms a reservoir (21) of used water. The used water can be re-circulated by a water circulation system which, for example, includes a water pump (22) which pumps water from the reservoir back to the source. To provide for a common reservoir to collect all the used water from all the baffles, the baffles are designed so that they do not extend until the bottom part of the compartment so that the used water can be collected at a single point without requiring multiple points for used water collection.

A small filter can be placed anywhere along the circulation system to remove the pollutants from time to time. As only a reasonably small filtering element is required in the circulation system to remove the pollutants, the maintenance or regular servicing of the filtering element will be significantly less and more convenient compared to the cleaning a conventional filter element which is inevitably large in size. On the other hand, the water circulation system may operate without a filtering element and the air-cleaning system may be maintained on regular basis by regularly draining the dirty water and replaced by clean water. A water draining device is placed at the bottom part of the compartment to drain the dirty water and a water inlet placed at the top part of the compartment is provided to allow refillment of fresh and clean water. Of course, the air-cleaning system can be regularly maintained by providing a filtering means in the water-circulation system as well as regular draining of dirty water and refilling by fresh water. Furthermore, additional water curtains may also be provided along the sides of the compartment at which the incoming air stream hits before substantially reversing its course. As an impact of the incoming air stream in a substantially normal orientation to a water curtain will likely increase the absorption of pollutants by the water curtain, an improved pollutant removal efficiency can be expected by providing such additional water curtains on the sides of the compartment without making the air-cleaner more complicated.

While the present invention has been explained by reference to the above preferred embodiment, it will be appreciated that the specific features as shown in the preferred embodiments are only provided for illustrative purposes and are not meant to be limiting to the scope of the invention or the protection thereof. In particular, while a plurality of air-cleaning baffles are described in the preferred embodiment, it will be appreciated that the air-cleaning apparatus can operate with a minimum of a single air-cleaning baffle or having a confined air channel of a U-, V- or C-shape with a water curtain for cleaning the air. Furthermore, while the air-cleaning baffles are substantially parallel in the preferred embodiment, other arrangement or dispositions are possible and water curtains can be provided on any side or both sides of the baffles for removing the pollutants. In particular, the inside of the compartment may be made into an air channel of a zig-zag, W-, S- or other curved shapes in order to extend the physical distance that an air stream has to travel down stream and air cleaning baffles or water curtains may be provided along the air channel.

Although generally described with reference to water, other fluids can be used or additives may be used with the water to cleanse or attract particular contaminants. The baffles have generally been described as not being permeable and with an air pathway around the sides. Other arrangements are possible including providing air paths over and under baffles, or through apertures in the baffles. The intention is to provide a convoluted pathway to increase exposure of the water curtains.

What is claimed is:

1. An air cleaning apparatus including an air-inlet, an air-outlet, an air-cleaning means for removing pollutants carried in an air stream, a compartment defined by substantially upright sides including laterally opposite sides, inside which compartment there is disposed an air channel joining said air-inlet and said air-outlet, said air channel defined by a plurality of substantially parallel baffles projecting from laterally opposite sides with alternating of said baffles defining a portion of said air channel between laterally opposite sides and an air-drawing device for drawing air into said compartment, wherein said air channel is adapted to cause the air stream coming into said compartment through said air-inlet to flow in a serpentine pattern across said compartment between said laterally opposite sides along said air-channel towards said air outlet and said air-cleaning means includes a fluid curtain disposed at least along a part of said air-channel.

2. An apparatus according to claim 1, wherein said baffles form an air-baffle which is disposed between said air-inlet and said air-outlet, wherein:

said air-baffle causes an incoming stream of air from said air-inlet to change course while moving down-stream and said baffle includes a surface on which there is provided a curtain of running fluid.

3. An apparatus according to claim 2, wherein said air-baffle causes change of course of said incoming air stream to move substantially parallel to a surface of said curtain.

4. An apparatus according to claim 1, wherein the course of the air flow between adjacent baffles are substantially reversed.

5. An apparatus according to claim 1, wherein said baffles together form a serial path for the passage of the incoming air towards the air-outlet and a plurality of fluid curtains are provided along the path of said air channel.

6. An apparatus according to claim 5, wherein a portion of the air-stream which is in immediate contact with a said baffle flows in a direction which is parallel to the fluid curtain provided on said baffle.

7. An apparatus according to claim 1, wherein a fluid curtain is formed at least on one side of said compartment.

8. An apparatus according to claim 1, wherein a reservoir of used fluid collected from said air-cleaning means is formed within said compartment.

9. An apparatus according to claim 5, wherein a common reservoir for collecting used fluid from said plurality of baffles is defined within said compartment.

10. An apparatus according to claim 1, wherein a plurality of serially joined U-, V- and C-shaped air-channels are connected between said air-inlet and said air-outlet.

11. An apparatus according to claim 8, further including a fluid circulation device which circulates the fluid from said reservoir to supply said fluid curtains.

12. An apparatus according to claim 11, wherein said fluid air circulation device includes a fluid cleaning apparatus to filter or clean the re-circulating fluid.

* * * * *